United States Patent
Motta

(10) Patent No.: US 9,620,940 B2
(45) Date of Patent: Apr. 11, 2017

(54) MEDIUM VOLTAGE SWITCHGEAR WITH FRONT ACCESSIBILITY OF CURRENT TRANSFORMERS MOUNTED EXTERNAL TO A REAR OF A CIRCUIT BREAKER COMPARTMENT

(71) Applicant: ABB Technology AG, Zurich (CH)

(72) Inventor: Stefano Motta, Besana Brianza (IT)

(73) Assignee: ABB SCHWEIZ AG, Baden (CH)

( * ) Notice: Subject to any disclaimer, the term of this patent is extended or adjusted under 35 U.S.C. 154(b) by 181 days.

(21) Appl. No.: 14/589,105

(22) Filed: Jan. 5, 2015

(65) Prior Publication Data

US 2016/0197459 A1 Jul. 7, 2016

(51) Int. Cl.
| | |
|---|---|
| *H02B 13/035* | (2006.01) |
| *H02B 11/26* | (2006.01) |
| *H02B 11/04* | (2006.01) |
| *H02B 1/26* | (2006.01) |
| *H02B 3/00* | (2006.01) |

(52) U.S. Cl.
CPC .......... *H02B 13/0356* (2013.01); *H02B 1/26* (2013.01); *H02B 3/00* (2013.01); *H02B 11/04* (2013.01); *H02B 11/26* (2013.01)

(58) Field of Classification Search
USPC ................................................. 361/600–621
See application file for complete search history.

(56) References Cited

U.S. PATENT DOCUMENTS

| | | | |
|---|---|---|---|
| 3,201,551 A | 8/1965 | Mercier | |
| 2015/0357774 A1* | 12/2015 | Ren ..................... | H01R 25/162 439/110 |
| 2016/0164268 A1* | 6/2016 | Yang ..................... | H02B 1/03 361/611 |

FOREIGN PATENT DOCUMENTS

| | | |
|---|---|---|
| CN | 2686171 Y | 3/2005 |
| JP | S5880718 U | 6/1983 |
| WO | 2014117354 A1 | 8/2014 |

OTHER PUBLICATIONS

International Search Report & Written Opinion in PCT/EP2016/050049 dated Mar. 31, 2016.

\* cited by examiner

*Primary Examiner* — Zachary M Pape
(74) *Attorney, Agent, or Firm* — Manelli Selter PLLC; Edward J. Stemberger

(57) ABSTRACT

A switchgear includes a circuit breaker housing defining a circuit breaker compartment. A bushing has first and second portions and extends through an opening in a rear wall of the housing so that the first portion is disposed in the circuit breaker compartment and the second portion is disposed beyond the exterior of the rear wall and external of the circuit breaker compartment. The bushing has a hollow primary contact. A current transformer is mounted on the second portion of the bushing. A fastener structure has a portion that extends through the hollow primary contact. The fastener structure couples the primary contact to a busbar in a removable manner. When the fastener structure is decoupled from the primary contact, the bushing and the at least one current transform can be accessed from the front of the housing and moved through the opening in the rear wall, for maintenance.

16 Claims, 7 Drawing Sheets

MEDIUM VOLTAGE SWITCHGEAR WITH FRONT ACCESSIBILITY OF CURRENT TRANSFORMERS MOUNTED EXTERNAL TO A REAR OF A CIRCUIT BREAKER COMPARTMENT

FIELD

The invention relates to switchgear, circuit breakers and, more particularly, to current transformers mounted on bushings external to a rear of a circuit breaker compartment yet accessible through the front to the circuit breaker compartment.

BACKGROUND

With reference to FIG. 1, an example of a conventional medium voltage switchgear is shown generally at 10. As used herein, the terms "medium voltage switchgear" refers to switchgear rated for operation up to and including 38 kV. In general, switchgear 10 comprises an enclosure, such as metal-clad enclosure 12, for housing the switchgear components. Enclosure 12 may contain one or more separate compartments, such as circuit breaker compartment 14, main bus compartment 16, and cable compartment 18. The bus and cable compartments can be formed as a single compartment. Switchgear 10 contains one or more circuit breakers, generally indicated at 20. In the embodiment shown, circuit breaker 20 is a three-pole drawout type circuit breaker. Circuit breaker 20 is connected to primary contacts that are supported by primary conductor bushings 22 that are connected to current-carrying bus bars 24.

In this typical switchgear arrangement, the current transformers 26 are mounted within the circuit breaker compartment 14. This allows easy maintenance and fast replacement of the current transformers in case of a fault or based on necessity. However, due to a narrow width of newer medium voltage switchgear, it is not possible to install the current transformers inside the circuit breaker compartment. Typically, the current transformers are installed behind or at the rear of the circuit breaker compartment in a narrow width switchgear. However, since the current transformers are located at the rear side of a circuit breaker housing, they may be difficult to access for maintenance.

Thus, when current transformers are mounted to a rear of a circuit breaker housing, there is a need to provide access to the current transformers through the front of the circuit breaker compartment.

SUMMARY

An objective of the invention is to fulfill the need referred to above. In accordance with the principles of the present invention, this objective is achieved by providing a switchgear that includes a circuit breaker housing having a front and a rear. The housing defines a circuit breaker compartment. The rear of the housing is defined by a rear wall having an interior and an exterior and an opening therethrough. A bushing has first and second portions and extends through the opening in the rear wall so that the first portion is disposed in the circuit breaker compartment and the second portion is disposed beyond the exterior of the rear wall and external of the circuit breaker compartment. The bushing has a hollow primary contact. A current transformer is mounted on the second portion of the bushing. A fastener structure has a portion that extends through the hollow primary contact. The fastener structure couples the primary contact to a busbar in a removable manner. When the fastener structure is decoupled from the primary contact, the bushing and the at least one current transform can be accessed from the front of the housing and moved through the opening in the rear wall and into the circuit breaker compartment, for maintenance.

In accordance with another aspect of an embodiment, a method removes a current transformer from a front of a circuit breaker compartment of a switchgear. The method provides an opening in a rear wall of the circuit breaker compartment. At least one bushing is mounted with respect to the rear wall so that a first portion of the bushing is disposed in the circuit breaker compartment and a second portion of the bushing is disposed through the opening and external of the circuit breaker compartment. The bushing has a primary contact removably coupled with a busbar, with the busbar being external of the circuit breaker compartment. At least one current transformer is provided on the second portion of the bushing. The primary contact is decoupled with a busbar and the bushing and the current transformer are moved through the opening wall and into the circuit breaker compartment, via the front of the circuit breaker compartment.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings wherein like numbers indicate like parts, in which.

DETAILED DESCRIPTION OF THE EXEMPLARY EMBODIMENTS

Figure 1:
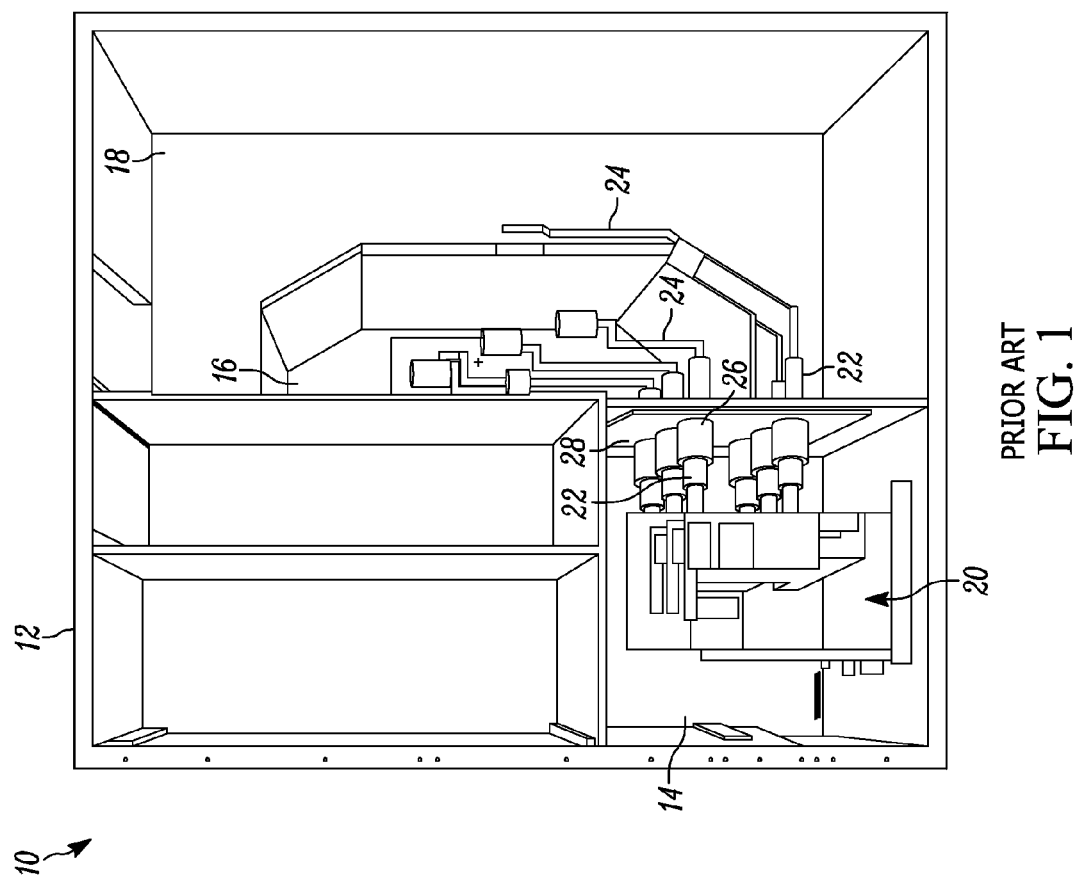
FIG. 1 is a side view of a portion of a conventional medium voltage switchgear.
Figure 2:
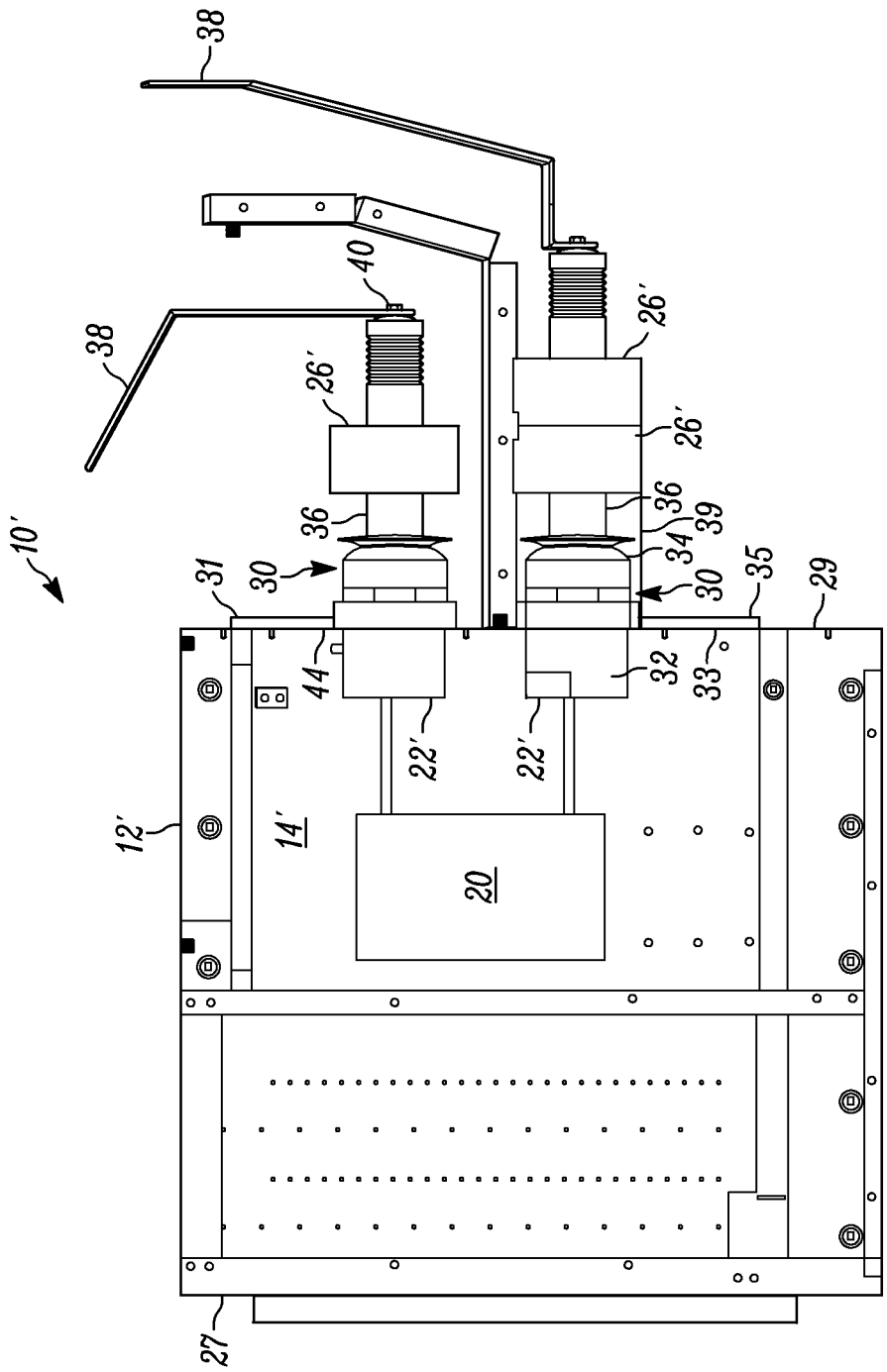
FIG. 2 is a side view of current transformers of mounted on bushing structure at a rear of a circuit breaker compartment, in accordance with an embodiment.
Figure 3:
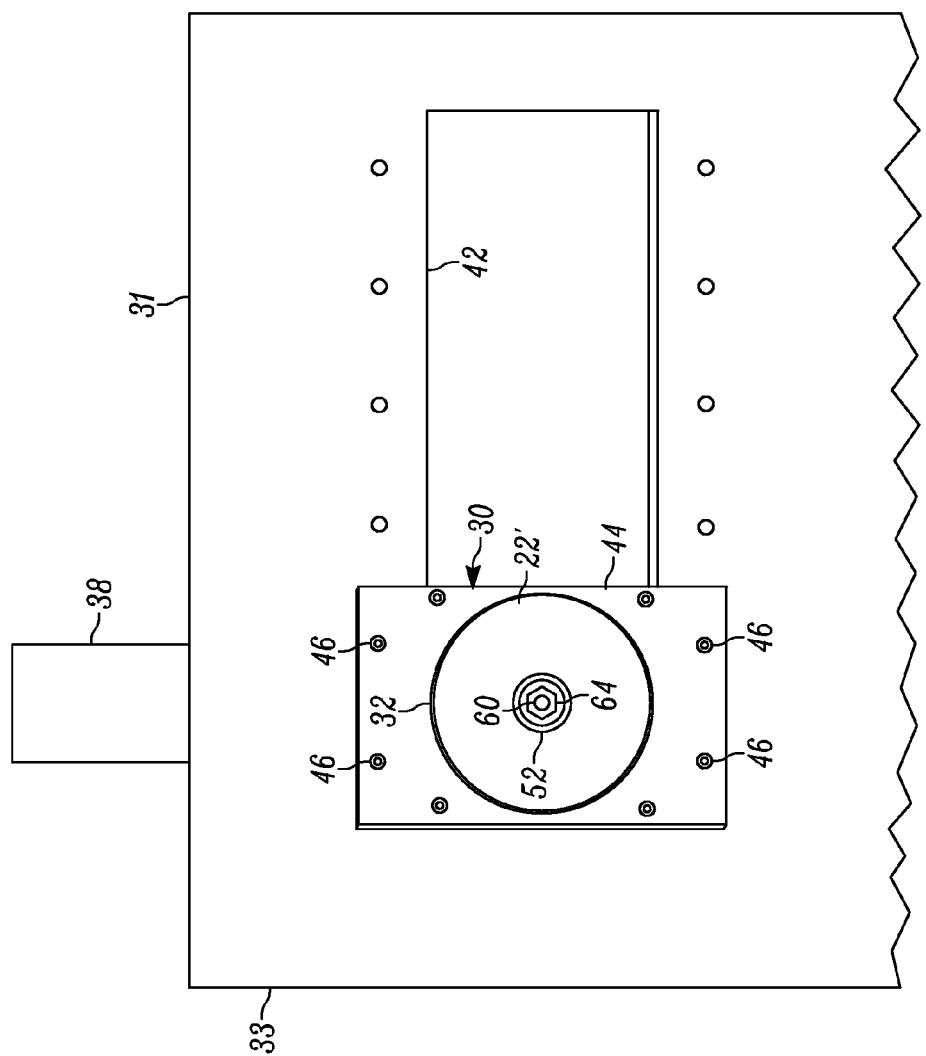
FIG. 3 is front view of one bushing structure and current transformer of FIG. 2, shown mounted to a portion of rear wall of a circuit breaker compartment of a switchgear.

With reference to FIG. 2, a portion of an air insulated switchgear 10' includes a circuit breaker housing 12' defining a circuit breaker compartment 14'. The housing 12' has a front 27 and a rear 29, with the rear 29 being defined by a rear wall 31. The rear wall 31 has an interior 33 and an exterior 35 and an opening 42 there-through (FIG. 3). In accordance with an embodiment, a plurality of bushing structures, generally indicated at 30, are mounted to the rear wall 31 of the housing 12'. Each bushing structure 30 includes a primary conductor bushing 22' extending through the rear wall 31 so that a cylindrical first portion 32 is disposed in the circuit breaker compartment 14' together with the circuit breaker 20, electrically coupled therewith. A cylindrical second portion 34 of each bushing 22' extends through the opening 42 and is disposed beyond the exterior 35 of the rear wall 31 and thus external of circuit breaker compartment 12'.

One or more compact current transformers 26' is mounted concentrically on a cylindrical extension 36 of each bushing 22'. A primary contact 50 is disposed in the extension 36 and a copper busbar 38 is coupled to the end of the contact 50 by a fastener structure 40. A tray 39 is coupled to the wall 31 and provides support to the associated current transformers 26'.

Figure 4:
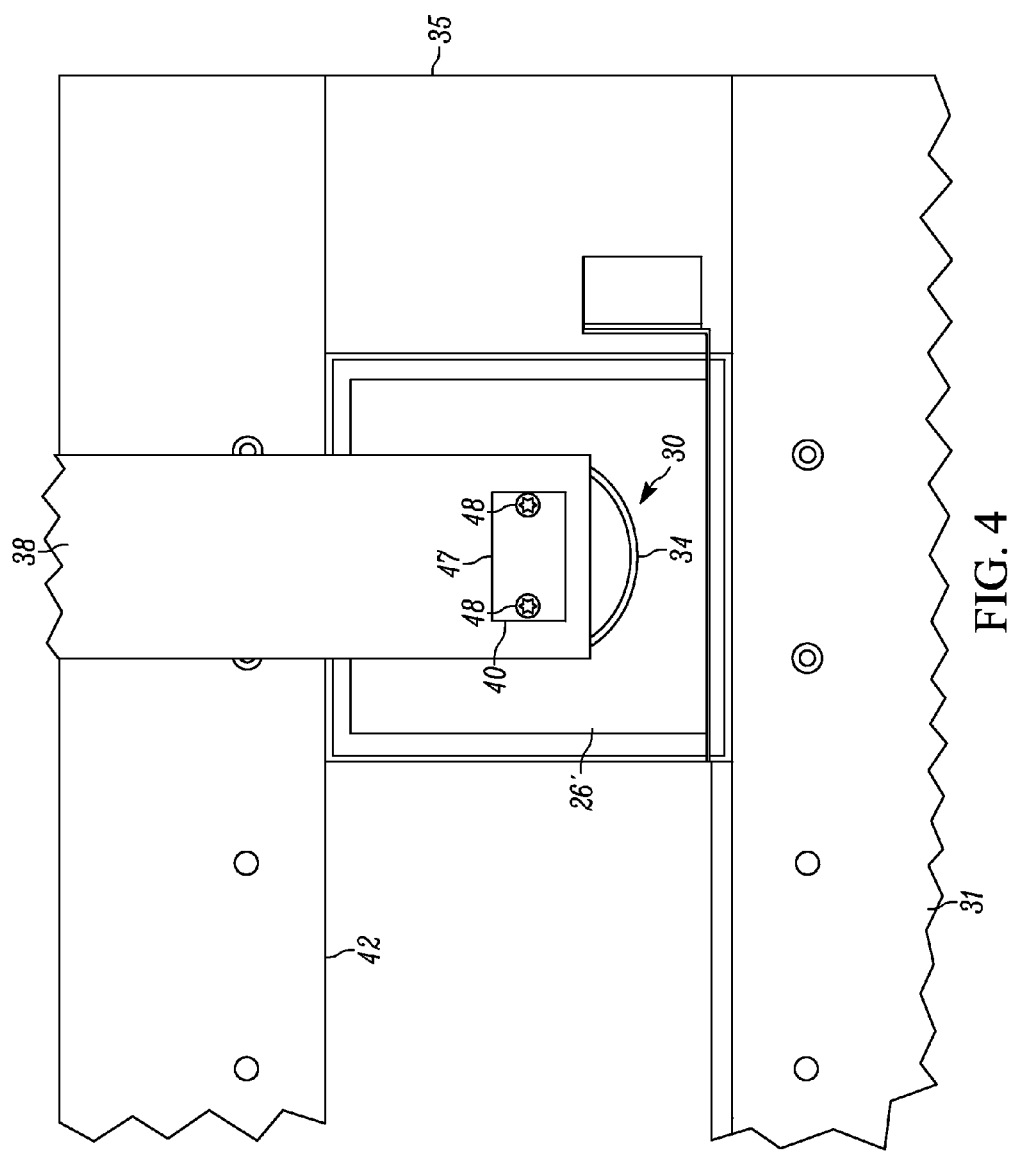
FIG. 4 is a rear view of the one bushing structure and current transformer of FIG. 3, shown mounted to a portion of rear wall of a circuit breaker compartment of the switchgear, with a fastener structure coupled with a busbar.

With reference to FIG. 3, a front view of a bushing structure 30 is shown mounted to the rear wall 31 of the housing 12'. Each bushing structure 30 includes a plate 44 to which the bushing 22' is coupled. Each plate 44 is fastened to the interior 33 of the rear wall 31 by fasteners 46. When all plates 44 of all bushing structures 30 are coupled side-by side to the rear wall 31, the common opening 42 is completely covered. FIG. 4 is a rear view of the bushing structure 30 of FIG. 3 shown mounted to the rear wall 31 of the housing 12'. The end 47 of fastener structure 40 is fixed to the busbar 38 by fasteners 48.

Figure 5:
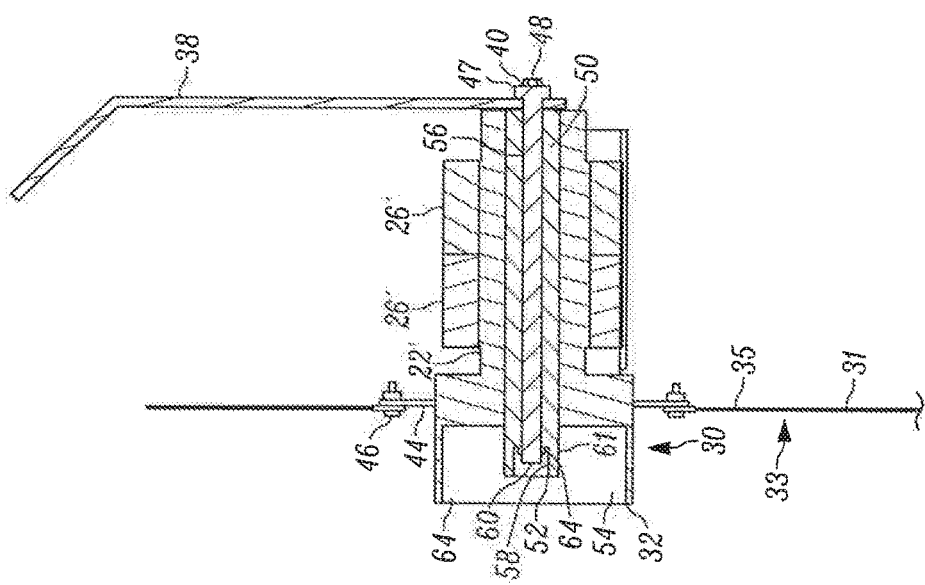
FIG. 5 is a side sectional view of the current transformers of FIG. 2 mounted on bushing structure at a rear of a circuit breaker compartment.
Figure 6:
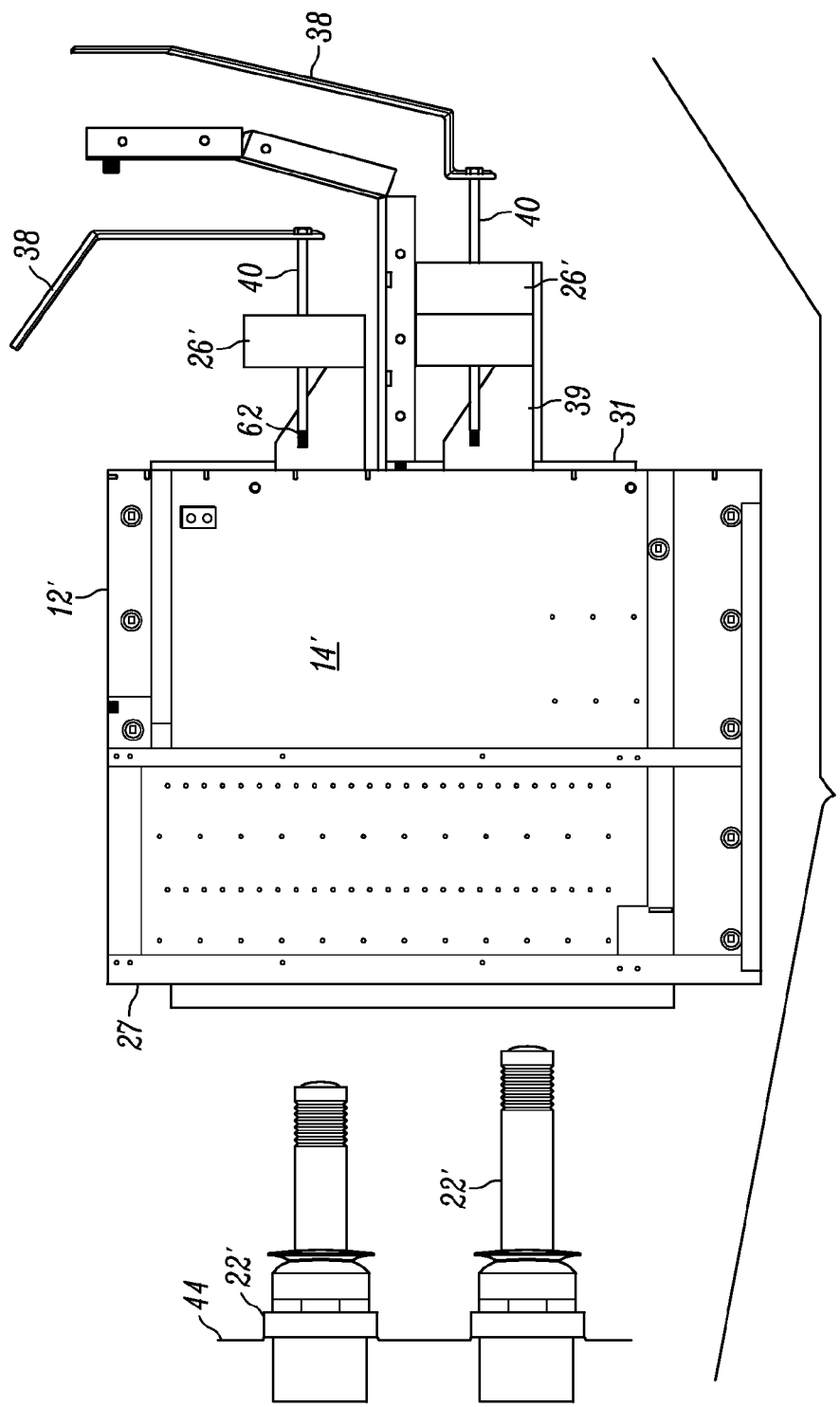
FIG. 6 is a side view the bushing structure of FIG. 1 removed from the current transformers, in accordance with an embodiment.
Figure 7:
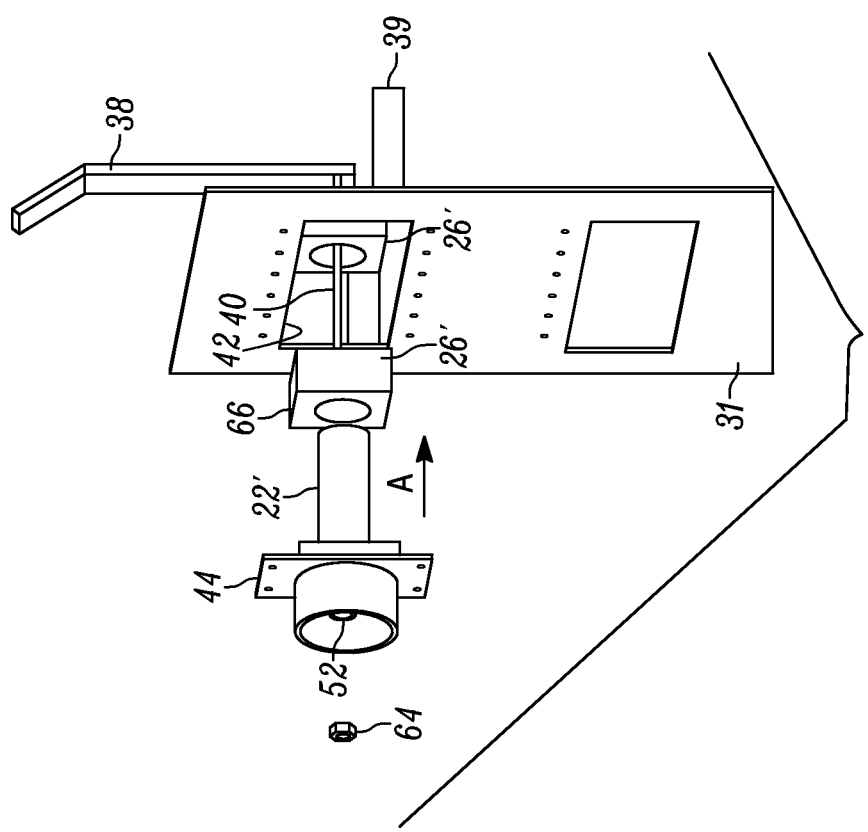
FIG. 7 is an exploded view showing the bushing structure and a current transformer accessed from the front of the switchgear and moved through the rear wall of the circuit breaker compartment.

With reference to FIGS. 5-7, each bushing structure 22' includes the generally cylindrical primary contact 50 disposed within and extending the length of the extension 36 so that an end 52 of the contact 50 extends into a hollow interior 54 of the first cylindrical portion 32 for contacting with the movable contact (not shown). The contact 50 has a bore 56 there-through and a portion of the fastener structure 40 extends through the bore 56. The end 52 of the contact 50 has a cutout 58 into which an end 60 of the fastener structure 40 extends. The cutout defines a contact surface 61. The end 60 of the fastener structure 40 includes threads 62 (FIG. 6) extending beyond the contact surface 61. The threads 62 receive a nut 64 so that when the nut 64 engages the surface 61, the contact 50 is coupled to the busbar 38 in a removable manner. The nut 64 can be considered to be part of the fastener structure 40. Thus, as shown in FIG. 5, the nut 64, providing a force on the contact 50, ensures that the busbar 38 is sandwiched between the end 47 of the fastener structure 40 and the contact 50. The fastener structure 40 as aids in centering of the busing installation.

With the above structure, maintenance or replacement of the current transformers 26' can advantageous be performed from the front 27 of the circuit breaker housing 12'. With reference to FIG. 3, the nut 64 is removed from the threads on the end 60 of the fastener structure 40 to decoupled the fastener structure 40 from the contact 50. The fasteners 46 are then removed so as to remove the bushing 22' and its plate 44 from the rear wall 31 of the housing 12'. As shown in FIG. 7, the current transformers 26' are now accessible for maintenance or replacement from the direction of arrow A (front 27 of housing 12) so as to be removed through the opening 42 in the rear wall 31, separate from or with the bushing 22'. Advantageously, the fastener structure 40 (without the nut 64) remains connected to the busbar 38, and the tray 39 remains coupled to the rear wall 31.

As can be appreciated from FIGS. 5-7, a repaired or new current transformer 26' can then be installed by moving the bore 66 of the current transformer 26' over the fastener structure 40 and placing the current transformer 26' on the tray 39. The The bushing 22' can then be moved so that the bore 56 of the contact 50 receives the fastener structure 40 and with the bore 66 of the current transformer 26' receiving the bushing structure 22'. The plate 44 can then be secured to the rear wall 31 by fasteners 46 and the nut 64 can be screwed onto the threads 62 on the end 60 of the fastener structure 40 to reconnect the contact 50 to the busbar 38.

Thus, it can be appreciated that with the embodiment, even though the current transformers 26' are mounted to a rear of a circuit breaker housing 12', they can advantageously be accessed from a front the circuit breaker housing for maintenance or replacement thus saving time and avoiding disconnection of cables, busbars and barriers.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A switchgear comprising:
   a circuit breaker housing having a front and a rear, the housing defines a circuit breaker compartment, the rear of the housing defined by a rear wall having an interior and an exterior and an opening there-through,
   at least one bushing having first and second hollow portions, the bushing extending through the opening in the rear wall so that the first portion is disposed in the circuit breaker compartment and the second portion is disposed beyond the exterior of the rear wall and external of the circuit breaker compartment, the bushing having a hollow primary contact that extends within both of the first and second hollow portions of the bushing, with a first end of the primary contact extending into the first hollow portion,
   at least one current transformer mounted on the second portion of the bushing,
   a busbar, and
   a fastener structure, separate from the hollow primary contact and having a portion that extends through the hollow primary contact, coupling a second end of the primary contact to the busbar in a removable manner,
   wherein, when the fastener structure is decoupled from the primary contact, the bushing, with the primary contact, and the at least one current transform can be accessed from the front of the housing and moved through the opening in the rear wall and into the circuit breaker compartment, for maintenance.

2. The switchgear of claim 1, further comprising a plate coupled to the bushing, the plate being removably coupled to the interior of the rear wall so as to cover at least a portion of the opening when coupled to the rear wall.

3. The switchgear of claim 2, wherein the plate is coupled to the rear wall by fasteners.

4. The switchgear of claim 1, wherein an end of the hollow primary contact includes a cutout defining a contact surface, and wherein the fastener structure has first and second ends, the first end being fixed to the busbar, the second end including threads that extend beyond the contact surface, the fastener structure includes a nut being received by the threads and engaging the contact surface to couple the primary contact to the busbar.

5. The switchgear of claim 4, wherein the first end of the fastener structure is fixed to the busbar by at least one fastener.

6. The switchgear of claim 1, further comprising a circuit breaker in the circuit breaker compartment, the circuit breaker being electrically coupled with the bushing.

7. The switchgear of claim 1, further comprising a tray coupled to the rear wall and disposed external to the circuit breaker compartment for supporting the current transformer.

8. The switchgear of claim 1, wherein a portion of the fastener structure is constructed and arranged to remain coupled to the busbar when the bushing and the current transformer are moved through the opening.

9. A method of removing a current transformer from a front of a circuit breaker compartment of a switchgear, the method comprising the steps of:
providing an opening in a rear wall of the circuit breaker compartment,
mounting at least one bushing with respect to the rear wall so that a first hollow portion of the bushing is disposed in the circuit breaker compartment and a second hollow portion of the bushing is disposed through the opening and external of the circuit breaker compartment, the bushing having a primary contact that extends within both of the first and second hollow portions of the bushing and a first end of the primary contact extends into the first hollow portion, a second end of the primary contact is removably coupled with a busbar, the busbar being external of the circuit breaker compartment,
providing at least one current transformer on the second portion of the bushing,
decoupling the primary contact from the busbar, and
moving the bushing, with the primary contact, and the current transformer through the opening and into the circuit breaker compartment via the front of the circuit breaker compartment.

10. The method of claim 9, wherein a plate is coupled to the bushing and the plate is removably coupled to an interior of the rear wall so as to cover at least a portion of the opening, and wherein, prior to the decoupling step, the method further comprises:
decoupling the plate from the rear wall.

11. The method of claim 10, wherein the step of decoupling the plate includes removing fasteners that secure the plate to the rear wall.

12. The method of claim 9, wherein the primary contact is hollow and an end thereof include a cutout defining a contact surface, and a fastener structure extends through the hollow primary contact, a first end of the fastener structure is fixed to the busbar, a second end of the fastener structure includes threads that extend beyond the contact surface, a nut is received by the threads and engages the contact surface to couple the primary contact to the busbar, wherein the decoupling step includes removing the nut from the threads.

13. The method of claim 12, wherein the first end of the fastener structure is fixed to the busbar by at least one fastener.

14. The method of claim 9, further comprising:
providing a circuit breaker in the circuit breaker compartment, the circuit breaker being electrically coupled with the bushing.

15. The method of claim 9, further comprising:
coupling a tray to the rear wall so as to be disposed external to the circuit breaker compartment, the tray supporting the current transformer.

16. The method of claim 12, wherein the decoupling step is such that a portion of the fastener structure remains fixed to the busbar when the bushing and the current transformer are moved through the opening.

* * * * *